United States Patent
Hall et al.

(10) Patent No.: US 7,025,939 B1
(45) Date of Patent: Apr. 11, 2006

(54) POWER SUPPLY FOR PROCESSING OF GASEOUS MEDIA

(75) Inventors: Stephen Ivor Hall, Oxford (GB); Michael Inman, Abingdon (GB); Anthony Robert Martin, Abingdon (GB); David Raybone, Gloucester (GB); David Michael Weeks, Abingdon (GB); David Leslie Segal, Abingdon (GB)

(73) Assignee: Accentus Plc, Didcot (GB)

( * ) Notice: Subject to any disclaimer, the term of this patent is extended or adjusted under 35 U.S.C. 154(b) by 0 days.

(21) Appl. No.: 09/889,370

(22) PCT Filed: Jan. 18, 2000

(86) PCT No.: PCT/GB00/00108

§ 371 (c)(1),
(2), (4) Date: Jul. 17, 2001

(87) PCT Pub. No.: WO00/43645

PCT Pub. Date: Jul. 27, 2000

(30) Foreign Application Priority Data

Jan. 21, 1999 (GB) .................................... 9901219

(51) Int. Cl.
*B01J 19/08* (2006.01)

(52) U.S. Cl. ............................................. 422/186.04
(58) Field of Classification Search ........... 422/186.05, 422/168, 186.04, 213, 177; 60/275
See application file for complete search history.

(56) References Cited

U.S. PATENT DOCUMENTS

| | | | | |
|---|---|---|---|---|
| 3,979,193 | A * | 9/1976 | Sikich | 96/54 |
| 4,954,320 | A * | 9/1990 | Birmingham et al. | 422/186.04 |
| 5,044,157 | A * | 9/1991 | Henkel | 60/274 |
| 5,284,556 | A * | 2/1994 | Rich | 204/164 |
| 5,440,876 | A * | 8/1995 | Bayliss et al. | 60/274 |
| 5,609,736 | A * | 3/1997 | Yamamoto | 204/164 |
| 5,695,619 | A * | 12/1997 | Williamson et al. | 204/165 |
| 5,927,069 | A * | 7/1999 | Wang et al. | 60/275 |
| 6,548,027 | B1 * | 4/2003 | Hall et al. | 422/186.04 |

* cited by examiner

Primary Examiner—Kevin P. Kerns
(74) Attorney, Agent, or Firm—William H. Holt

(57) ABSTRACT

A reactor (1) particularly for the plasma treatment of internal combustion engine exhaust gases, in which a power supply (10) and a reactor bed (2) of the dielectric barrier discharge type are connected directly and enclosed in an earthed metal chamber (17) which both isolates the high voltage power supply and acts as a Faraday cage preventing the emission of electromagnetic radiation from the power supply or plasma.

15 Claims, 2 Drawing Sheets

POWER SUPPLY FOR PROCESSING OF GASEOUS MEDIA

Figure 1:
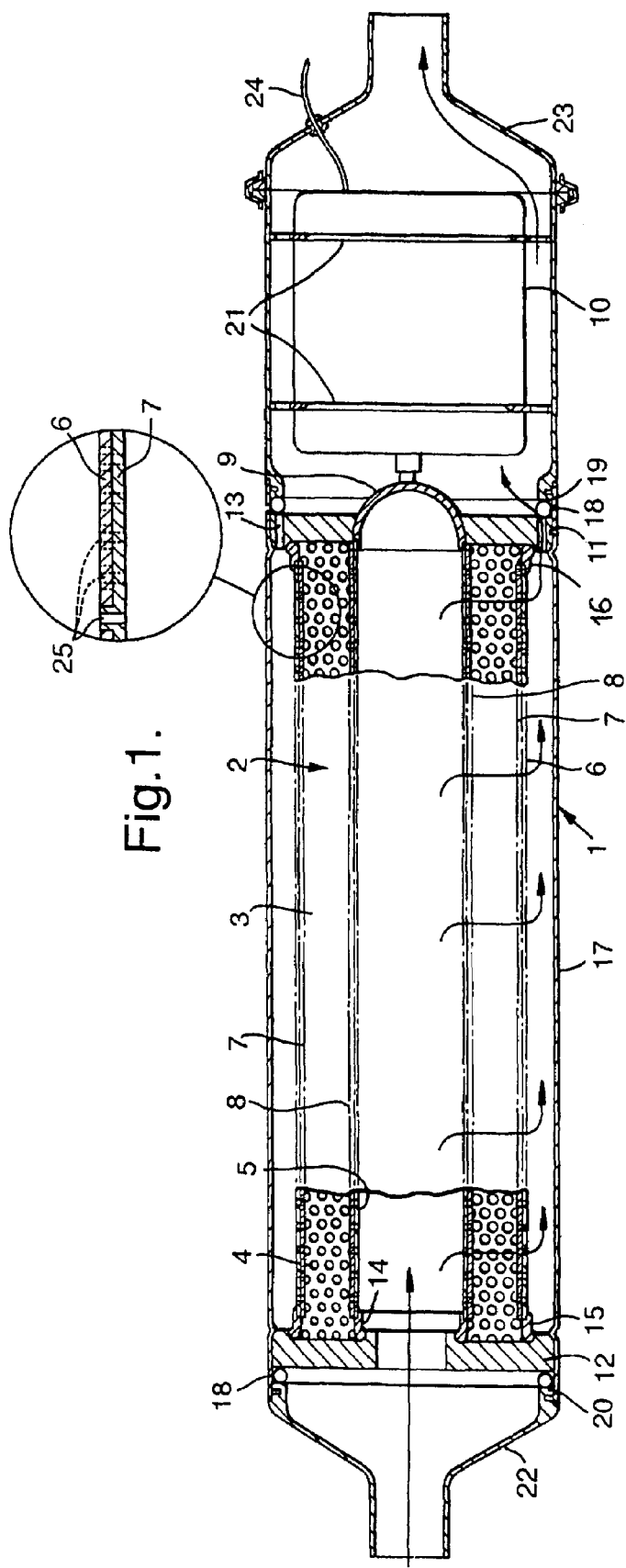

The present invention relates to the processing of gaseous media and in particular to the reduction of the emission of particulate and other materials from the exhausts of internal combustion engines.

One of the major problems associated with the development and use of internal combustion engines is the noxious exhaust emissions from such engines. Two of the most deleterious materials, particularly in the case of diesel engines, are particulate carbon and oxides of nitrogen ($NO_x$). Increasingly severe emission control regulations are forcing internal combustion engine and vehicle manufacturers to find more efficient ways of removing these materials in particular from internal combustion engine exhaust emissions. Unfortunately, in practice, it is found that a number of techniques which improve the situation in relation to one of the above components of internal combustion engine exhaust emissions tend to worsen the situation in relation to the other. Even so, a variety of systems for trapping particulate emissions from internal combustion engine exhausts have been investigated, particularly in relation to making such particulate emission traps capable of being regenerated when they have become saturated with particulate material.

Examples of such diesel exhaust particulate filters are to be found in European Patent Application EP 0 010 384; U.S. Pat. Nos. 4,505,107; 4,485,622; 4,427,418; and 4,276,066; EP 0 244 061; EP 0 112 634 and EP 0 132 166.

In all the above cases, the particulate matter is removed from the exhaust gases by a simple, physical trapping of particulate matter in the interstices of a porous, usually ceramic, filter body, which is then regenerated by heating the filter body to a temperature at which the trapped diesel exhaust particulates are burnt off. In most cases the filter body is monolithic, although EP 0 010 384 does mention the use of ceramic beads, wire meshes or metal screens as well. U.S. Pat. No. 4,427,418 discloses the use of ceramic coated wire or ceramic fibres.

In a broader context, the precipitation of charged particulate matter by electrostatic forces also is known. However, in this case, precipitation usually takes place upon large planar electrodes or metal screens.

It is known also to remove pollutants from internal combustion engine exhaust gases by establishing an electric discharge in a reactor chamber through which the exhaust gases are made to pass. The electric discharge causes the conversion of the pollutants to less harmful materials, which are discharged from the reactor chamber to the atmosphere. Examples of such devices are given in GB 2 274 412; European Patent Application 0 366 876; OLS DE 3708508; and U.S. Pat. No. 3,180,083.

However, in the above mentioned systems the high voltages required to excite the electric discharges are generated by power sources which are remote from the devices in which the removal of the pollutants from the exhaust gases is carried out. Not only does this require the use of high voltage transmission systems with their attendant safety implications, but in cases where pulsed dc or ac voltages are used to excite the electric discharges, considerable electromagnetic emissions can occur.

It is an object of the present invention to provide a reactor device especially suitable for the reduction of internal combustion exhaust emissions in which these problems are addressed.

Our published patent application WO99/05400 describes and claims a reactor for the processing of a gaseous medium, including a reactor bed, means for constraining a gaseous medium to be processed to flow through the reactor bed and a power supply unit adapted to generate and apply a potential across the reactor bed which is sufficient to excite an electric discharge in the gaseous medium flowing through the reactor bed, wherein the reactor bed and the power supply unit are adjacent, directly connected together electrically, preferably co-axial, and preferably are enclosed in an electrically conducting enclosure which is adapted to be maintained at ground potential.

We have now found that a particularly advantageous form of reactor for use in combination as aforesaid with an adjacent, directly coupled power supply is a reactor of the dielectric barrier discharge type also known as a silent discharge reactor.

Accordingly, the present invention provides a reactor for processing a gaseous medium, the reactor including a reactor bed and at least two electrodes, conduits for constraining a gaseous medium to flow through the reactor bed, a power supply unit connected to the reactor bed for generating and applying a potential across the reactor bed for exciting an electric discharge in the gaseous medium as it flows through the reactor bed, wherein the reactor is a dielectric barrier discharge reactor wherein at least one of the electrodes has a dielectric barrier coating applied thereto, the reactor bed and the power supply unit being located adjacent to each other and enclosed in an electrically conductive enclosure that is maintained at ground potential, and means for electrically connecting the reactor bed and the power supply unit directly together.

The present invention also provides a reactor for processing a gaseous medium, the reactor including a reactor bed, at least two electrodes, conduits for constraining a gaseous medium to flow through the reactor bed, a power supply unit for generating and applying an electric potential across the reactor bed for exciting an electric discharge in the gaseous medium as it flows through the reactor bed, the reactor comprising a dielectric barrier discharge reactor wherein at least one of the electrodes has a dielectric barrier coating coated thereon, the reactor bed and the power supply unit being located adjacent to each other and connected directly together electrically, the reactor and the power supply unit forming an electrical circuit, the electrical circuit having a resonant frequency and the power supply unit having an output voltage which has a frequency, and means for making the resonant frequency substantially equal to the frequency of the output voltage from the power supply unit, the reactor being adapted for incorporation into an exhaust system of a variable speed, internal combustion, engine; a step-up transformer having primary windings and secondary windings, an ac generator connected to the primary windings, the ac generator having an output frequency, means for maintaining the output frequency at a pre-determined value regardless of variations in the variable speed of the internal combustion engine in the exhaust system of which the reactor is incorporated, and wherein the engine includes drive means for driving the ac generator at a constant speed.

Not only does the grounded enclosure isolate electrically the reactor bed and the power supply unit but it acts as a Faraday cage so as to prevent the emission of electromagnetic radiation when pulsed dc or ac potentials are used to excite the gaseous medium.

Preferably, the enclosure consists of a sealed metal chamber enclosing the reactor bed and the power supply unit. Alternatively the enclosure can be non-metallic or partially metallic but surrounded by a metallic coating or other metal structure.

Preferably the reactor bed consists of a cylindrical body of gas permeable dielectric material contained between two concentric gas permeable electrodes the outer one of which is grounded and the inner one of which is connected directly to the means for generating the said potential, one or both sides of the electrodes in contact with the reactor bed material being coated with a dielectric material that constitutes the dielectric barrier. Dielectric material in the bed and on the electrodes need not necessarily be the same material. In use the potential applied excites a non-thermal plasma discharge in the region between the electrodes.

Preferably the reactor bed comprises a body of gas permeable dielectric material in the form of spheres, pellets, extrudates, fibres, sheets, coils, granules, wafers, meshes, frits, foams, honeycomb monolith or membrane in the plasma region of the non-thermal plasma. Combinations of one or more of the above forms of gas permeable dielectric bed material can be used and can be arranged to create a structure with a non-uniform surface area and porosity, for example a graded porosity, when presented to the gas.

In a particular embodiment of the invention the reactor chamber is adapted to form part of the exhaust system of an internal combustion engine.

Figure 2:
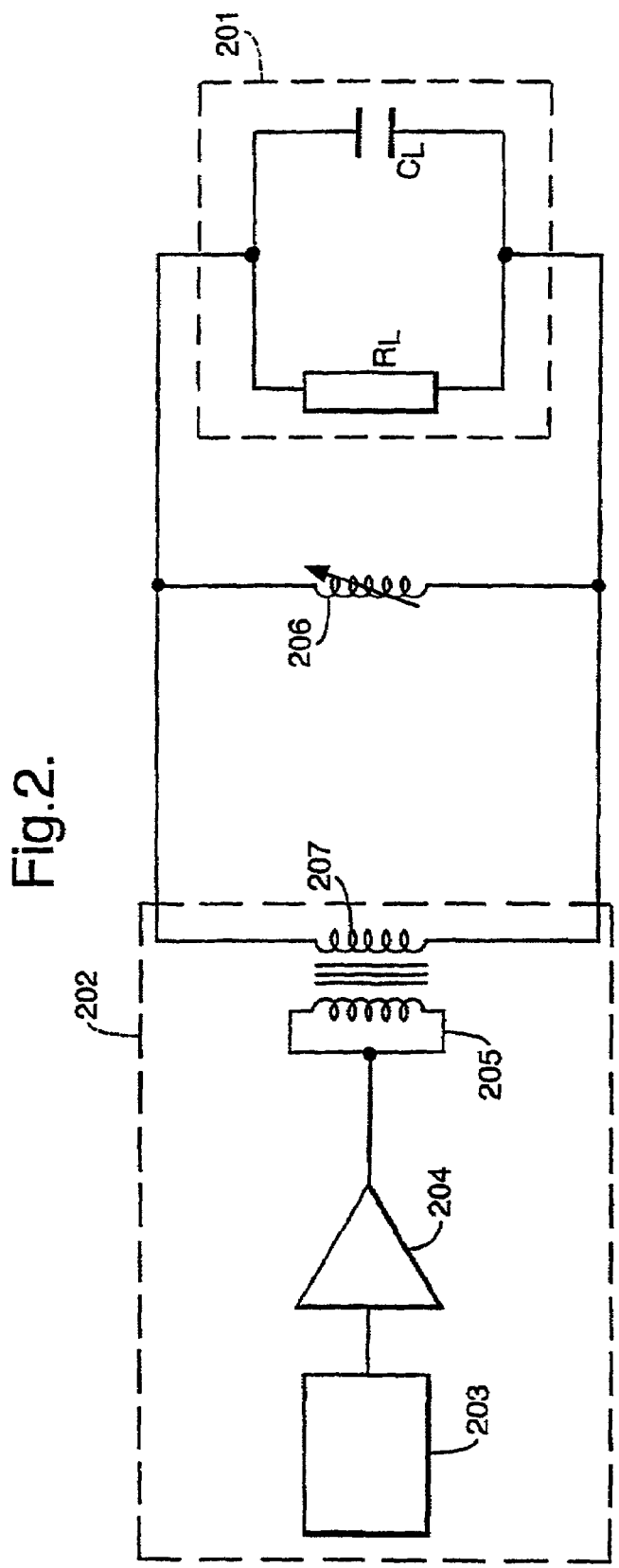

The invention will now be described, by way of example, with reference to the accompanying drawings in which, FIG. 1 is a longitudinal section of a reactor for reducing exhaust emissions from an internal combustion engine;

FIG. 2 is a representation of the electrical circuits associated with the present invention.

In FIG. 1 a particular embodiment of reactor design is shown wherein both electrodes have a dielectric barrier coating. But the design is equally applicable when only one of the electrodes has such a coating. Referring to FIG. 1 of the drawings a reactor assembly 1 for treating the exhaust gases from internal combustion engines comprises a reactor bed 2 which consists of a bed 3 of pellets 4 of a ceramic dielectric material, such as described in our earlier patent GB 2 274 412, which is contained between inner and outer perforated stainless steel electrodes 5 and 6 respectively. Surfaces of the electrodes are coated with an insulating layer of dielectric, represented schematically at 7 and 8. The thickness of this coating depends upon the breakdown strength of the dielectric material used, but will typically be of the order of 1 mm or 2 mm. The coating extends in this example to cover the inner surfaces of the perforations in the steel electrodes but such as to allow passage of exhaust gas through the perforations in the radial direction shown. This is illustrated in the enlarged inset in FIG. 1 in which the perforations are referenced 25.

The inner electrode 5 is closed by a stainless steel thimble 9 which is connected directly to a high voltage power supply 10, which is capable of delivering 30 kV pulses at a repetition frequency in the range 50 Hz–15 kHz. The ends of the reactor bed 2 are closed by two ceramic end-plates 11 and 12 respectively which also act as support plates. The end-plate 11, which is at the same end of the reactor bed 2 as the thimble 9 has a series of axial holes 13 around its periphery. Also at the ends of the electrodes 5 and 6 are stainless steel rings 14, 15, and 16 which are so shaped as to reduce as far as is practicable arcing between the ends of the electrodes 5 and 6 and their respective end-plates 11 and 12. The whole assembly is encased in a gas tight stainless steel chamber 17. Thermal expansion of the reactor bed 2 is accommodated by expansion rings 18 positioned between the supports 11 and 12 and respective abutments 19 and 20, which form part of the chamber 17. The power supply 10 is positioned within the chamber 17 by perforated plates or spiders 21. The chamber 17 has inlet and outlet nozzles 22 and 23, respectively, by means of which it can be attached to the remainder of an internal combustion engine exhaust system, which is not shown in the drawing.

The power supply 10, which is positioned at the cooler end of the reactor assembly 1, includes an inverter for converting a dc input 24 from a vehicles power supply to a pulsed, or alternating form and transforming it to some 30 kV before applying it to the inner electrode 5 of the reactor bed 2. The voltage shape can take the form of a regularly varying wave such as sinusoidal ac, which may be half-wave rectified, the form of a unipolar or bipolar square wave or a unipolar or bipolar pulse. Of course it is necessary to ensure that the components of the power supply 10 are capable of operating at the relatively high temperatures which exist in internal combustion engine exhaust systems. The direction of gas flow shown helps to reduce the temperature of the exhaust gases before they reach the power supply 10. However, if the power supply 10 is capable of withstanding the higher temperatures it can be positioned at the other end of the reactor assembly 1.

Referring to FIG. 2, the electrical components of a gas discharge reactor such as those described above can be represented primarily as a resistive load $R_L$ of the order of hundreds of kilo ohms and a capacitive load CL of the order of hundreds of pico farads in parallel with the resistive load of $R_L$. The reactor 201 is shown as being connected to a power supply 202 which includes a pulsed DC source or AC generator 203, a power amplifier 204 and a step-up transformer 205. The power supply 202 produces an output potential of some 20 kV at a frequency of about 10 kHz. At this sort of frequency, the capacitive current through the reactor 201 may be a factor of ten greater than the resistive current. It is the resistive component of the current flowing through the reactor 201 which is the effective one so far as the operation of the reactor 201 is concerned. In order to minimise the size of the capacitive current drawn from the power supply 202, and hence the size of the power supply 202, a variable inductance 206 is connected in parallel with the reactor 201 and its value is adjusted until the LCR circuit formed by it and the resistive and capacitive components $R_L$ and $C_L$ of the reactor 201 is resonant at the output frequency of the power supply 202. A typical value for the inductance is some 3 henries. At least some of this can be supplied by the secondary winding 207 of the output transformer 205 in the power supply 202. When the LCR circuit is resonant with the output from the power supply 202, the reactive current drawn from the power supply 202 is small, leaving only the resistive component, which therefore can be much greater for a given power supply than otherwise would be the case.

Where the tuning inductance is formed by the secondary winding of the transformer 205 alone. The reactive current will flow through the secondary winding 207 of the transformer 205. At resonance, however, the reactive current will not be seen in the primary winding of the transformer 205, so that the power demanded from the power source 203 will be minimised.

In the case of a reactor for the treatment of vehicle exhaust gases, the AC generator 203 may be driven by the engine of a vehicle in the exhaust system of which the reactor 201 is incorporated. However, a problem which then arises is that the frequency of the output current from the generator 203 is dependent upon the engine speed, which is undesirable, particularly when it is desired to operate the reactor 201 at the resonant frequency of the combined transformer secondary winding 204 and reactor 202 circuit, as above.

One way of overcoming this problem is to incorporate a constant speed drive unit between the engine of the vehicle and the generator 203.

A first form of constant speed drive unit which can be used consists of a variable displacement pump driven by the engine of the vehicle which is connected via a pressure or flow regulating system to an hydraulic motor so as to deliver a constant speed output drive to the generator 203 whatever the engine speed.

A second form of constant speed drive can be provided by including a fluid viscous coupling between the engine and the generator 203. Such couplings consist of a turbine the casing of which is driven by one component of the system and the impellor of which drives the other component of the system. The drive speed is controlled either by varying the amount of fluid in the coupling or by varying the angle of the impeller blades.

A hydro-mechanical constant drive system which can be used consists of a number of driver and driven metal disks, the depth of immersion of which in a bath of a viscous oil can be varied in response to engine speed signals generated by a transducer. As the depth of immersion of the disks is increased, so the slippage between them is reduced, and vice versa.

A purely mechanical adjustable speed system consists of two spring-loaded axially adjustable v-pulleys and belts. The engine is coupled to one pulley and the generator 203 to the other. The diameter of the pulley coupled to the engine is varied inversely with the engine speed.

A somewhat similar system employs two conical disks between which there are two planetary cones. Rotation by the engine of the disk coupled to it causes the cones to rotate both the main axis of the drive system and about their own axes. The closer these two rotational speeds are, the slower is the rotation of the other disk connected to the generator 203. Maintenance of the output drive speed is achieved by means of a control ring which alters the rotation of the planetary cones about their own axes.

An electrical controlled speed drive system includes a dc electric motor operated by the vehicle's battery which powers an hydraulic motor which is coupled to the generator 203.

A further controlled speed drive system utilises a variable magnetic field generated across an air gap between two ferromagentic disks, one coupled to the engine and the other to the generator 203.

The invention is not restricted to the details of the foregoing examples. For instance, whilst a radial flow configuration is preferred an axial flow configuration is possible. In that case, the electrodes are constructed to be impermeable to the exhaust gases and the end supports are appropriately perforated to allow axial flow therethrough.

The invention claimed is:

1. A reactor for processing a gaseous medium, said reactor including a reactor bed and at least two electrodes, conduits for constraining a gaseous medium to flow through said reactor bed, a power supply unit connected to said reactor bed for generating and applying a potential across said reactor bed for exciting an electric discharge in said gaseous medium as it flows through said reactor bed, wherein said reactor is a dielectric barrier discharge reactor wherein at least one of said electrodes has a dielectric barrier coating applied thereto, said reactor bed and said power supply unit being located adjacent to each other and enclosed in an electrically conductive enclosure that is maintained at ground potential, and means for electrically connecting said reactor bed and said power supply unit directly together.

2. A reactor according to claim 1, wherein said reactor bed comprises reactor bed material, said potential being applied across said reactor bed by said electrodes being in contact with said reactor bed material, and at least one side of said electrodes having a coating of dielectric material coated thereon.

3. A reactor according to claim 1 wherein said reactor bed is comprised of a cylindrical body of gas permeable dielectric material contained between an inner, concentric, gas permeable electrode and an outer, concentric, gas permeable electrode, said outer, concentric, gas permeable electrode being connected directly to ground and said inner, concentric, gas permeable electrode being connected directly to said power supply unit, and said conduits directing said gaseous medium to pass radially through said cylindrical body of gas permeable dielectric material.

4. A reactor according to claim 1, wherein said reactor bed consists of a cylindrical body of gas permeable dielectric material contained between an outer, non-permeable electrode and an inner, non-permeable electrode, said outer electrode being connected to ground and said inner electrode being connected directly to said power supply unit, and said conduits constraining said gaseous medium to flow axially through said cylindrical body.

5. A reactor according to claim 1, wherein said reactor bed is comprised of gas permeable dielectric material in the form of spheres, pellets, extrudates, fibers, sheets, coils, granules, wafers, meshes, frits, foams, honeycomb monolith or membrane, or combinations with one or more of the above forms.

6. A reactor according to claim 1, wherein said power supply unit comprises means for producing a pulsed, or alternating, output voltage.

7. A reactor according to claim 1, wherein said electrodes and said power supply unit form an electrical circuit having a resonant frequency, said power supply unit having an output voltage having a frequency, and means for making said resonant frequency of said electrical circuit substantially equal to said frequency of said output voltage from said power supply unit.

8. A reactor according to claim 7, wherein said means for making said resonant frequency of said electrical circuit including said electrodes substantially equal to that of said output voltage from said power supply unit is comprised of an appropriate inductance means connected in parallel with said electrical circuit.

9. A reactor according to claim 7, wherein said power supply unit includes an output for generating a voltage of the order of tens of kilovolts at a frequency within the range of 50 Hz to 15 kHz.

10. A reactor according to claim 1 including means for incorporating said reactor into an exhaust system of an internal combustion engine.

11. A reactor according to claim 10, including a step-up transformer having primary windings and secondary windings, an ac generator connected to said primary windings, said ac generator having an output frequency, said internal combustion engine having a variable rotational speed, and means for maintaining said output frequency at a predetermined value regardless of variations in said rotational speed of said internal combustion engine in the exhaust system of which said reactor is incorporated.

12. A reactor processing a gaseous medium, said reactor including a reactor bed, at least two electrodes, conduits for constraining a gaseous medium to flow through said reactor bed, a power supply unit for generating and applying an electric potential across said reactor bed for exciting an electric discharge in said gaseous medium as it flows through said reactor bed, said reactor comprising a dielectric barrier discharge reactor wherein at least one of said electrodes has a dielectric barrier coating coated thereon, said reactor bed and said power supply unit being located adjacent to each other and connected directly together electrically, said reactor and said power supply unit forming an electrical circuit, said electrical circuit having a resonant frequency and said power supply unit having an output voltage which has a frequency, and means for making said resonant frequency substantially equal to the frequency of said output voltage from said power supply unit, said reactor being adapted for incorporation into an exhaust system of a variable speed, internal combustion, engine; a step-up transformer having primary windings and secondary windings, an ac generator connected to said primary windings, said ac generator having an output frequency, means for maintaining said output frequency at a pre-determined value regardless of variations in the variable speed of said internal combustion engine in the exhaust system of which the reactor is incorporated, and wherein said engine includes drive means for driving said ac generator at a constant speed.

13. A reactor according to claim 12, wherein said drive means comprises a hydraulic drive unit having a drive efficiency which varies inversely with the speed of said engine.

14. A reactor according to claim 12, wherein said drive means comprises a stepless, variable speed, transmission system having an effective gear ratio which varies inversely with the speed of said engine.

15. A reactor according to claim 12, wherein said drive means includes an electromagnetic clutch having a drive efficiency which varies inversely with the speed of said engine.

* * * * *